United States Patent
Kwak et al.

(10) Patent No.: US 10,104,497 B2
(45) Date of Patent: Oct. 16, 2018

(54) DETECTION OF PROXIMITY OF CLIENT DEVICE TO BASE STATION

(71) Applicant: EMPIRE TECHNOLOGY DEVELOPMENT LLC, Wilmington, DE (US)

(72) Inventors: Jin Sam Kwak, Uiwang-si (KR); Hyun Oh Oh, Gwacheon-si (KR); Ju Hyung Son, Uiwang-si (KR)

(73) Assignee: Empire Technology Development LLC, Wilmington, DE (US)

( * ) Notice: Subject to any disclaimer, the term of this patent is extended or adjusted under 35 U.S.C. 154(b) by 91 days.

(21) Appl. No.: 15/128,957

(22) PCT Filed: Mar. 25, 2014

(86) PCT No.: PCT/US2014/031787
§ 371 (c)(1),
(2) Date: Sep. 23, 2016

(87) PCT Pub. No.: WO2015/147809
PCT Pub. Date: Oct. 1, 2015

(65) Prior Publication Data
US 2017/0105094 A1  Apr. 13, 2017

(51) Int. Cl.
*H04W 4/02* (2018.01)
*H04W 72/04* (2009.01)

(52) U.S. Cl.
CPC ....... *H04W 4/023* (2013.01); *H04W 72/0413* (2013.01)

(58) Field of Classification Search
CPC .......... H04L 27/2691; H04W 28/0236; H04W 40/16; H04W 52/0238; H04W 52/244;
(Continued)

(56) References Cited

U.S. PATENT DOCUMENTS

| 6,907,252 B2 * | 6/2005 | Papadias | H04W 4/02 455/456.1 |
| 2009/0163216 A1 * | 6/2009 | Hoang | H04W 36/0055 455/450 |

(Continued)

FOREIGN PATENT DOCUMENTS

| WO | 2004064003 A1 | 7/2004 |
| WO | 2013068058 A1 | 5/2013 |

OTHER PUBLICATIONS

QUALCOMM, "Effective Interference Management", Opportunistic Small Cells—Research Project, Retrieve from the Internet at <URL: https://www.qualcomm.com/invention/research/projects/lte-advanced/opportunistic-small-cells> on Aug. 10, 2016, pp. 2.

(Continued)

*Primary Examiner* — Benjamin H Elliot, IV

(57) ABSTRACT

Technologies are generally described for detecting proximity of a client device to a base station in a wireless communication system. Example base station may include a proximity detector and an operation mode controller. The proximity detector may analyze a property of a signal transmitted by a client device to detect an envelope of the signal including a buzz-type waveform. If the envelope of the signal is determined to include a buzz-type waveform, the client device is determined to be within communication range of the base station. Further, the operation mode controller may convert a current operation mode of the base station to a particular operation mode that enables the base station to support communication by the client device. In some embodiments, the buzz-type waveform may be a waveform of an uplink control signal that is transmitted by the client device when it is not actively engaged in communication.

20 Claims, 8 Drawing Sheets

(58) Field of Classification Search
CPC .............. H04W 4/023; H04W 72/0413; H04B 1/1027; H04B 15/00
See application file for complete search history.

(56) References Cited

U.S. PATENT DOCUMENTS

| | | | |
|---|---|---|---|
| 2011/0003591 A1 | 1/2011 | Venkatachalam et al. | |
| 2013/0114450 A1* | 5/2013 | Xu | H04W 72/0426 370/252 |
| 2015/0163747 A1* | 6/2015 | Chen | H04B 1/109 455/78 |
| 2016/0013759 A1* | 1/2016 | Watkins | H03F 1/0222 330/295 |
| 2016/0374022 A1* | 12/2016 | Ang | H04L 5/0007 |
| 2017/0105094 A1* | 4/2017 | Kwak | H04W 4/023 |

OTHER PUBLICATIONS

"Envelope Detector", Concepts of Engineering, Retrieve from the Internet at <URL: http://studychamberblogspot.in/2012/04/envelope-detector.html> on Aug. 10, 2016, Apr. 1, 2012, pp. 3.

"Path Loss", Wikipedia, Retrieve from the Internet at <URL: https://web.archive.org/web/20130425043521/http://en.wikipedia.org/wiki/Path_loss> on Aug. 5, 2016, last modified on Apr. 15, 2016, pp. 4.

Jeffrey G. Andrews et al., "Femtocells: Past, Present, and Future", IEEE Journal on Selected Areas in Communications, Apr. 2012, pp. 497-508, vol. 30, No. 3.

Suna Choi et al., "Analysis of Interfered Noise for Sound Systems Over LTE Mobile Phones", The Eighth International Conference on Wireless and Mobile Communications, 2012, pp. 290-293.

Soumya Das et al., "CSG Proximity Detection Enhancement Using Out-of-band Radio of Home NodeB", IV International Congress on Ultra Modern Telecommunications and Control Systems and Workshops (ICUMT), Oct. 3-5, 2012, pp. 162-167.

International Search Report and Written Opinion of the International Searching Authority, International application No. PCT/US2014/031787, dated Aug. 27, 2014.

Aamod Khandekar et al., "LTE-Advanced: Heterogeneous Networks", Europe Wireless Conference, Apr. 12-15, 2010, pp. 978-982.

Ronny Yongho Kim et al., "WiMAX Femtocell: Requirements, Challenges, and Solutions", IEEE Communications Magazine, Sep. 2009, pp. 84-91, vol. 47, No. 9.

Ying Li et al., "Overview of Femtocell Support in Advanced WiMAX Systems", IEEE Communications Magazine, Jul. 2011, pp. 122-130, vol. 49, No. 7.

Ryan Whitwam, "What Causes GSM Buzz?", Geek-Mobile, Retrieve from the Internet at <URL: https://web.archive.org/web/20130905155728/http://www.geek.com/mobile/what-causes-gsm-buzz-1538169/> on Aug. 10, 2016, Feb. 1, 2013, pp. 2.

* cited by examiner

DETECTION OF PROXIMITY OF CLIENT DEVICE TO BASE STATION

CROSS-REFERENCE TO RELATED APPLICATIONS

The present application is a U.S. National Stage filing under 35 U.S.C. § 371 of International Application No. PCT/US2014/031787, filed on Mar. 25, 2014, and entitled "DETECTION OF PROXIMITY OF CLIENT DEVICE TO BASE STATION." International Application No. PCT/US2014/031787, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

Increasing demand for wireless data traffic has created opportunities for new network architectures incorporating multitier base stations (BSs) with various sizes and capabilities. Some cellular communication systems employ small-sized low-power BSs, such as femtocell BSs, because of their advantages such as low cost deployments, traffic offloading from macrocells, etc. Femtocell BSs may be BSs with the size comparable to customer-premises equipment (CPE) or Wi-Fi access point (AP), which typically may provide indoor wireless coverage to mobile stations (MSs) using fixed broadband Internet connections.

Mass deployment of femtocells in existing mobile communication networks may create various technical challenges, such as interference between neighboring femtocells as well as between femtocells and macrocells, because femtocells may share the same licensed frequency spectrum with macrocells. In order to reduce the interference between femtocells and macrocells as well as power consumption in femtocells, an optional operation mode such as a low duty mode (LDM) in IEEE 802.16m (WiMAX-Advanced) and a dormant mode in Global System for Mobile Communications (GSM) or in Long Term Evolution (LTE) may be used. In these operation modes, air interface activity may be reduced as much as possible if there are no mobile stations connected to femtocell BSs or opportunistic small cells.

In order to detect the proximity of mobile stations at a small cell, the small cell should continue to monitor cellular uplink signals even in the LDM or dormant mode. However, such always-on cellular uplink signal monitoring may be a burden in terms of uplink decoding time and power consumption. Furthermore, the detection of proximity by monitoring for the cellular uplink signal to macrocell BSs or femtocell BSs may not be accurate due to an imbalance of uplink coverage between femtocell and macrocell BSs.

SUMMARY

Technologies generally described herein relate to detecting proximity of a client device to a base station in a wireless communication system.

Various example base station configured to detect proximity of a client device described herein may include one or more of a receiver, a proximity detector, and/or an operation mode controller. The receiver may be configured to receive a signal transmitted by the client device. The proximity detector may be coupled to the receiver and may be configured to analyze a property of the received signal to determine whether the client device is within communication range of the base station. The analysis of the property of the signal may include detection of an envelope of the signal to determine whether the envelope of the signal includes a buzz-type waveform. The operation mode controller may be coupled to the proximity detector and may be configured to convert, in response to determination that the client device is within the communication range of the base station, a current operation mode of the base station to a particular operation mode that enables the base station to support communication with the client device.

In some examples, methods in a base station to detect proximity of a client device are described. Example methods may include receiving a signal transmitted by the client device. A property of the received signal may be analyzed to determine that the client device is within a communication range of the base station. Analyzing the property of the signal may include detecting an envelope of the signal to determine whether the envelope of the signal includes a buzz-type waveform. In response to determination that the client device is within the communication range, a current operation mode of the base station may be converted to a particular operation mode that enables the base station to support communication with the client device.

In some examples, a computer-readable storage medium is described that may be adapted to store a program executable by one or more processors. The processor may include various features as further described herein. The program may include one or more instructions to detect a signal transmitted by a wireless communication device, and determine from the detected signal that the communication device is within communication range of a base station, by determination that an envelope of the signal includes a buzz-type waveform. The program may further include one or more instructions to convert, in response to determination that the communication device is within the communication range, a current operation mode of the base station to a particular operation mode that enables the base station to support communication with the communication device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
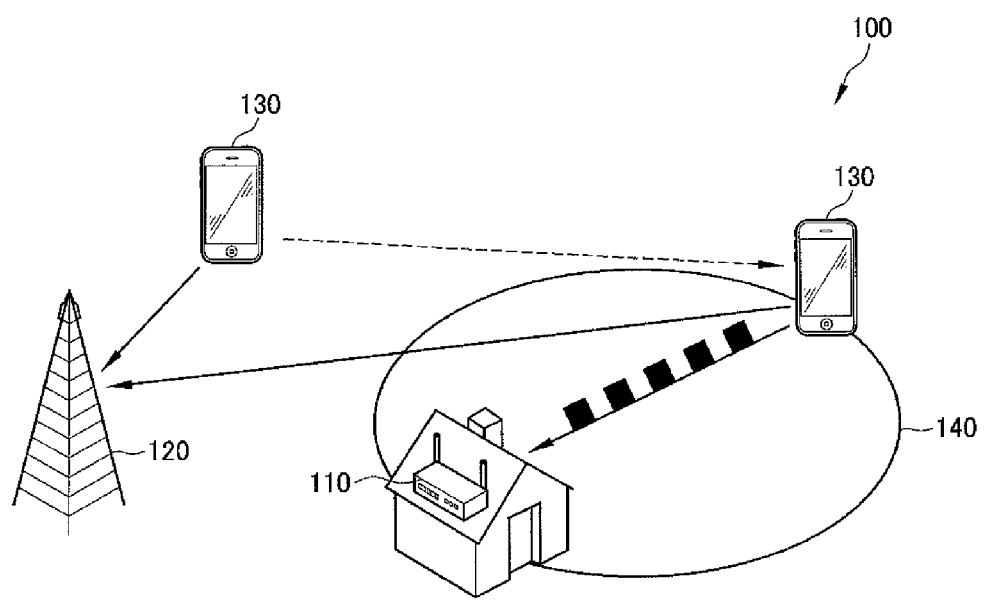
FIG. 1 shows a diagram of an example wireless communication system where a base station may be configured to detect proximity of a client device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to detecting proximity of a client device to a base station in a wireless communication system.

Briefly stated, technologies are generally described for detecting proximity of a client device to a base station in a wireless communication system. Example devices/systems described herein may include one or more of a proximity detector and/or an operation mode controller in a base station. The proximity detector may be configured to analyze a property of a signal transmitted by a client device. The analysis of the property of the signal may include detection of an envelope of the signal including a buzz-type waveform. If the envelope of the signal is determined to include the buzz-type waveform, the client device may be determined to be within communication range of the base station. In response to determination that the client device may be within the communication range of the base station, the operation mode controller may convert a current operation mode of the base station (for example, low duty mode or dormant state) to a particular operation mode that enables the base station to support communication with the client device. In some embodiments, the buzz-type waveform may be embodied by a waveform that is included in uplink control or data traffic signals (for example, a physical uplink control channel (PUCCH) signal or a physical uplink shared channel (PUSCH) signal) that are transmitted by the client device to a serving base station such as, for example, a macro-cell base station while the client device is not actively engaged in communication with a nearby base station such as, for example, a small-cell base station.

FIG. 1 shows a diagram of an example wireless communication system where a base station may be configured to detect proximity of a client device, arranged in accordance with at least some embodiments described herein. As depicted, a wireless communication system 100 may include one or more of a small-cell base station 110, a macro-cell base station 120, and/or a client device 130. In some embodiments, wireless communication system 100 may be a cellular network system employing any suitable cellular technology including, but not limited to, Global System for Mobile communications (GSM), Code Division Multiple Access (CDMA), Long Term Evolution (LTE), Worldwide Interoperability for Microwave Access (WiMax) technology, and/or others.

In some embodiments, small-cell base station 110 may be a low-powered radio access node that has a communication range of a small-cell network including, but not limited to, a microcell, a femtocell, a picocell, a relay and a hotspot. As depicted in FIG. 1, small-cell base station 110 may be typically designed for use in a home or small business in such a manner that it allows a service provider to extend service coverage indoors or at the cell edge, for example, supporting several active client devices in a residential setting. On the other hand, macro-cell base station 120 may be a high-powered radio base station that provides a greater communication range than a small-cell network. Further, client device 130 may be any suitable type of mobile device with wireless communication capabilities including, but not limited to, a cellular phone, a smartphone, a tablet computer, a wearable computer such as smartglasses or smartwatch, or other wireless communication device.

In operation, client device 130 may be initially communicating with macro-cell base station 120. In the meantime, if small-cell base station 110 operating in a normal operation mode determines that there is no client device located within a communication range 140 of small-cell base station 110, small-cell base station 110 may switch its current operation mode to an inactive operation mode such as a dormant state or a low duty mode in LTE or GSM. In some embodiments, before small-cell base station 110 enters the inactive operation mode, small-cell base station 110 may wait until a timer expires while monitoring if any client device is detected to be within communication range 140 of small-cell base station 110. If any client is detected to be within communication range 140 before the timer expires, small-cell base station 110 may stay in the normal operation mode.

While small-cell base station 110 is in the inactive operation mode, small-cell base station 110 may activate a proximity detector to determine whether there is any client device approaching or entering communication range 140. For example, as illustrated in FIG. 1, client device 130 communicating with macro-cell base station 120 may move towards communication range 140 of small-cell base station 110. Thus, when client device 130 is located proximate to or move across the boundary of communication range 140, the proximity detector of small-cell base station 110 may receive a signal transmitted by client device 130 and analyze a property of the received signal to determine that client device 130 is within communication range 140. For example, the analysis of the property of the received signal may include detection of an envelope of the signal to determine whether the envelope of the signal includes a buzz-type waveform. The buzz-type waveform may be a waveform that is included in the signal while client device 130 transmits the signal but is not actively engaged in communication with small-cell base station 110. Thus, if it is determined that the envelope of the signal includes a buzz-type waveform, client device 130 may be considered to be within communication range 140.

In some embodiments, the buzz-type waveform may be observed due to the periodic transmission of uplink control or data traffic signals (for example, a physical uplink control channel (PUCCH) signal or a physical uplink shared channel (PUSCH) signal) in LTE), which has an envelope of low-frequency waveform. For example, in a LTE communication system, such signal characteristic may be associated with a LTE frame structure including a 1-ms subframe as a basic transmission time interval (that is, a basic resource allocation time unit) and a 10-ms frame as a synchronization or system information transmission unit.

Figure 2:
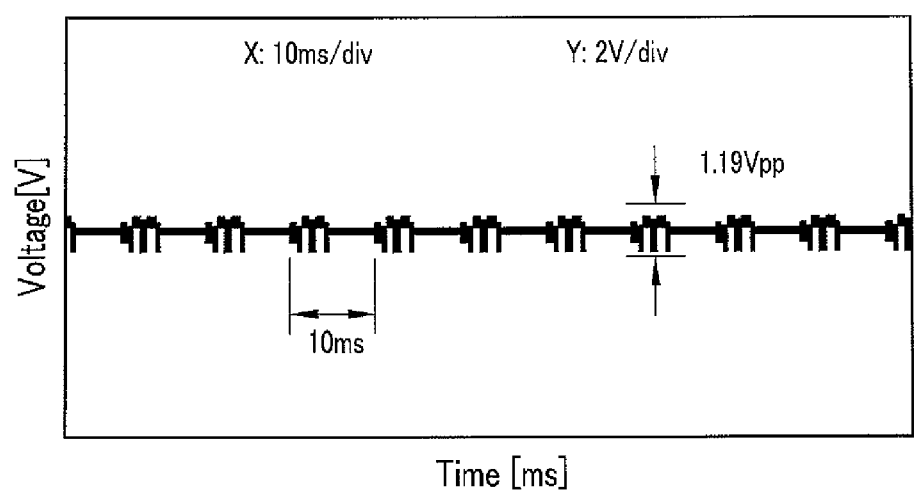
FIG. 2 illustrates a graph showing an example buzz-type waveform that may be included in a signal while a client device transmits the signal but is not actively engaged in communication with a base station.

FIG. 2 illustrates a graph showing an example buzz-type waveform that may be included in a signal while a client device transmits the signal but is not actively engaged in communication with a base station, arranged in accordance with at least some embodiments described herein. As depicted, a buzz-type waveform in a LTE communication system may show about 10 msec of periodicity, which may correspond to a length of a LTE frame. In other words, the periodicity of low frequency waveform in a LTE signal may provide an envelope of a signal having a frequency of about 100 Hz to about 1 kHz or its harmonics. Further, in a GSM communication system, a similar low frequency buzz-type signal may be observed. In case of using a GSM signal having a frame length of about 4.615 msec, a low frequency signal having a frequency of about 217 Hz may be observed.

Referring back to FIG. 1, in response to determination that client device 130 is within communication range 140 of small-cell base station 110, small-cell base station 110 may switch (or convert) the inactive operation mode of small-cell base station 110 to a particular operation mode that enables small-cell base station 110 to support communication with client device 130. Additionally, the received signal may be further decoded, e.g., by snooping, to obtain detailed information on client device 130 (e.g., station ID).

Figure 3:
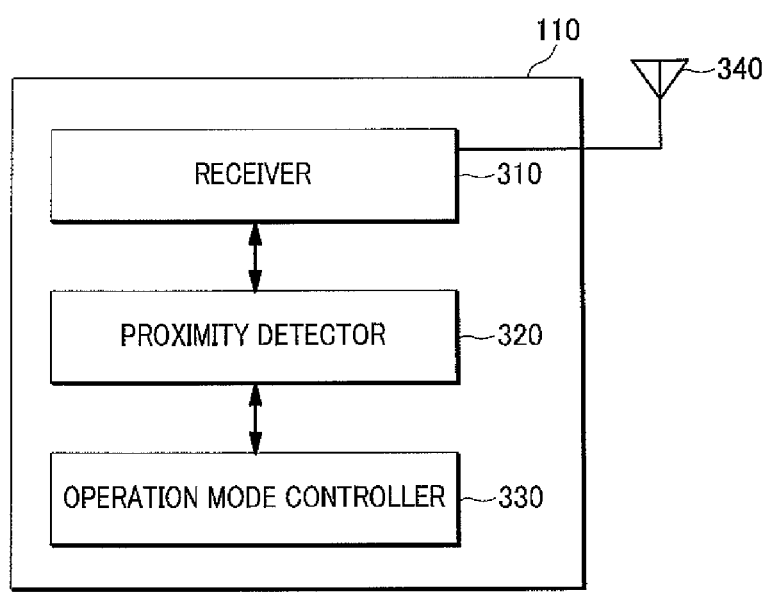
FIG. 3 shows a block diagram of an example base station configured to detect proximity of a client device.

FIG. 3 shows a block diagram of an example base station configured to detect proximity of a client device, arranged in accordance with at least some embodiments described herein. As illustrated, a base station (shown and described herein by way of example as the small-cell base station 110) may include one or more of a receiver 310, a proximity detector 320, and/or an operation mode controller 330. In some embodiments, the depicted base station may be small-cell base station 110 or a low-powered radio access node that has a communication range of a small-cell network including, but not limited to, a microcell, a femtocell, a picocell, a relay and a hotspot.

In some embodiments, receiver 310 may be configured to receive a signal transmitted by a client device such as client device 130 through a wireless antenna 340 coupled to receiver 310. Further, proximity detector 320 may be coupled to receiver 310 and may be configured to analyze a property of the received signal to determine whether the client device is within communication range of small-cell base station 110. The analysis of the property of the signal may include detection of an envelope of the signal to determine whether the envelope of the signal includes a buzz-type waveform. The buzz-type waveform may be a waveform that is included in the signal while the client device 130 transmits the signal but is not actively engaged in communication with small-cell base station 110. For example, the signal may include uplink control or data traffic signals having a low frequency envelope, such as a PUCCH signal or a PUSCH signal for use in a LTE communication system.

In some embodiments, proximity detector 320 may be further configured to determine whether the detected envelope of the signal matches the buzz-type waveform within a proximity detection threshold. Further, proximity detector 320 may be configured to adjust the proximity detection threshold based on a power strength of the signal.

In some embodiments, operation mode controller 330 may be coupled to proximity detector 320. Further, operation mode controller 330 may be configured to convert, in response to determination that the client device is within the communication range of base station 110, a current operation mode of base station 110 to a particular operation mode that enables the base station to support communication with the client device. For example, to convert the current operation mode to the particular operation mode, operation mode controller 330 may convert an LTE low duty mode or dormant state of base station 110 to the particular operation mode. In some other examples, operation mode controller 330 may convert a GSM dormant state of base station 110 to the particular operation mode. In some embodiments, operation mode controller 330 may additionally decode uplink control information (e.g., station ID) from the signal.

In some embodiments, proximity detector 320 may include an envelope detector configured to detect an envelope of the signal. The envelope detector may be embodied by an electronic circuit that is operable to receive a high-frequency signal as an input and provide an output which is the envelope of the original signal. For example, the envelope detector may include a rectifier configured to convert an alternating current of the signal to a direct current, and a low-pass filter configured to pass low-frequency components of the direct current as the envelope of the signal.

Figure 4:
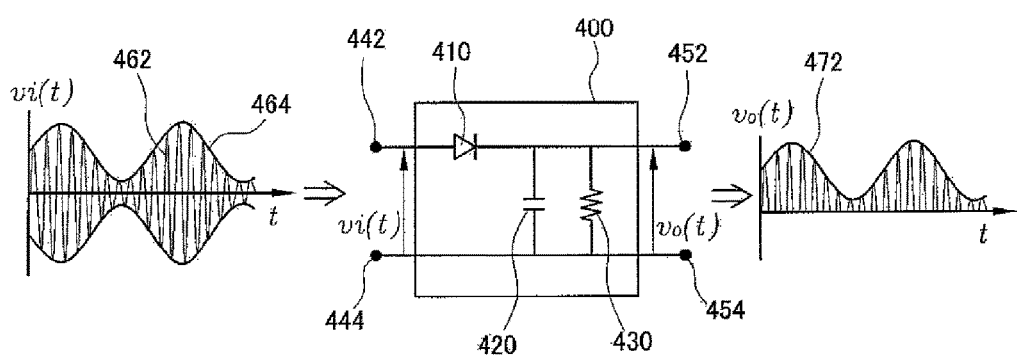
FIG. 4 schematically shows an example envelope detector for use in a base station configured to detect proximity of a client device.

FIG. 4 schematically shows an example envelope detector for use in a base station configured to detect proximity of a client device, arranged in accordance with at least some embodiments described herein. As illustrated, an envelope detector 400 may include one or more of a diode 410, a capacitor 420 and/or a resistor 430. Diode 410 may be coupled to input terminals 442 and 444 and capacitor 420 in series form. Also, capacitor 420 may be coupled to resistance 430 in parallel form, which may be coupled to output terminals 452 and 454. In some embodiments, envelope detector 400 may be employed in a proximity detector such as proximity detector 320 to detect an envelope of a signal received by a receiver such as receiver 310.

In operation, envelope detector 400 may be operable to receive an input signal $v_i(t)$ having high-frequency components 462 and provide an output signal $v_o(t)$ with a low-frequency component 472 which substantially correspond to an envelope 464 of the original signal $v_i(t)$. More specifically, diode 410 may rectify the input signal $v_i(t)$ and allow a current flow of the input signal $v_i(t)$ only when positive input terminal 442 is at a higher potential than negative input terminal 444. Further, capacitor 420 may store up electrical charge on the rising edge of the rectified input signal and release it slowly through resistor 430 as the output signal $v_o(t)$ when the signal falls.

Figure 5:
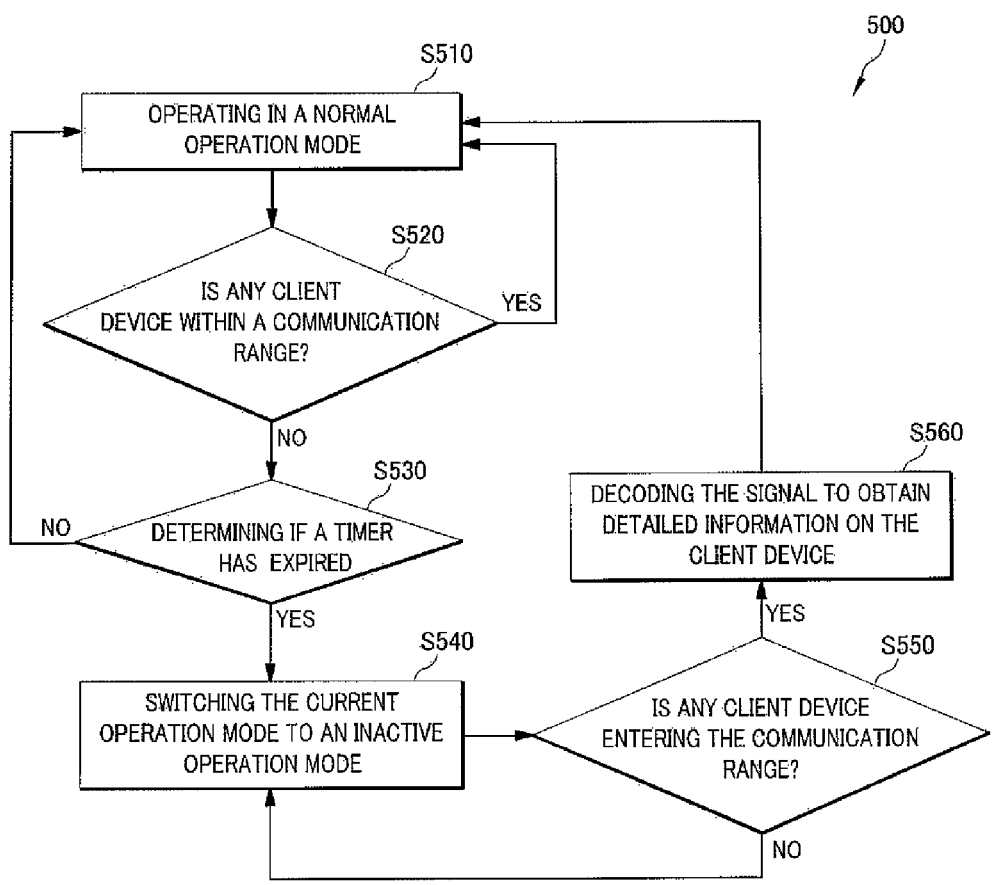
FIG. 5 illustrates an example flow diagram of a method adapted to detect proximity of a client device in a base station.

FIG. 5 illustrates an example flow diagram of a method adapted to detect proximity of a client device in a base station, arranged in accordance with at least some embodiments described herein. An example method 500 in FIG. 5 may be implemented using, for example, a computing device including a processor adapted to detect or control detection of proximity of a client device in a base station.

Method 500 may include one or more operations, actions, or functions as illustrated by one or more of blocks S510, S520, S530, S540, S550 and/or S560. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Method 500 may begin at block S510, "OPERATING IN A NORMAL OPERATION MODE."

At block S510, a base station may be operating in a normal operation mode. As depicted in FIG. 1, small-cell base station 110 may be operating in a normal operation mode. At the same time, small-cell base station 110 may be monitoring if there is any client device located within communication rage 140 of small-cell base station 110. Block S510 may be followed by block S520, "IS ANY CLIENT DEVICE WITHIN A COMMUNICATION RANGE?"

At block S520, the base station may determine if there is any client device within its communication range. As illustrated in FIG. 1, small-cell base station 110 may determine that there is no client device located within the communication range 140 while client device 130 has moved out of communication range 140 and/or is communicating with macro-cell base station 120. If it is determined in block S520 that there is one or more client devices within the communication range of the base station, the base station may continue to operate in the normal operation mode (in block S510) where the base station communicates with the client devices. Otherwise, if it is determined in block S520 that there is no client devices within the communication range of the base station, the base station may proceed to perform block S530 and/or next operations as explained below. Block S520 may be followed by block S530, "DETERMINING IF A TIMER HAS EXPIRED."

At block S530, the base station may determine if a timer expired. As illustrated in FIG. 1, small-cell base station 110 may wait until a timer expires while monitoring if any client device is detected to be within communication range 140 of small-cell base station 110. In particular, if the timer has not expired yet, small-cell base station 110 may stay operating in the normal operation mode (in block S510) and check if there is any client device in communication range 140 (in block S520). If it is determined that there is no client device within communication range 140, small-cell base station 110 may check again if the timer has expired in block S530. Otherwise, if it is determined that there is any client device within communication range 140, small-cell base station 110 continue to operate in the normal operation mode. In some embodiments, the timer may be preset while the base station is communicating with a client device in the normal operation mode. In some other embodiments, block S530 may be omitted. If it is determined that the timer has expired in block S530, the base station may proceed to perform block S540 and/or next operations as explained below. Block S530 may be followed by block S540, "SWITCHING THE CURRENT OPERATION MODE TO AN INACTIVE OPERATION MODE."

At block S540, the base station may switch its current operation mode to an inactive operation mode. As depicted in FIG. 1, if it determines that there is no client device locating within a communication range 140 of small-cell base station 110 while operating in a normal operation mode, small-cell base station 110 may switch its current operation mode to an inactive operation mode such as a dormant state or a low duty mode in LTE/GSM/WiMAX. Block S540 may be followed by block S550, "IS ANY CLIENT DEVICE ENTERING THE COMMUNICATION RANGE?"

At block S550, the base station may detect if there is any client device entering the communication range. As illustrated in FIG. 1, while small-cell base station 110 is in the inactive operation mode, small-cell base station 110 may activate a proximity detector to determine whether there is any client device approaching or entering communication range 140.

Figure 6:
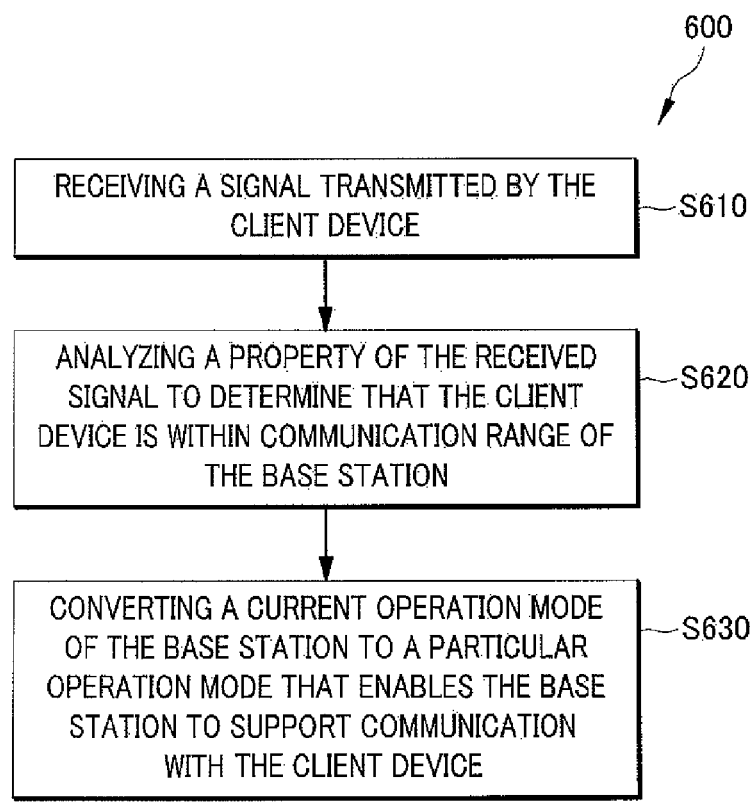
FIG. 6 illustrates another example flow diagram of a method adapted to detect proximity of a client device in a base station.

FIG. 6 illustrates another example flow diagram of a method adapted to detect proximity of a client device in a base station, arranged in accordance with at least some embodiments described herein. An example method 600 in FIG. 6 may be implemented using, for example, a computing device including a processor adapted to detect or control detection of proximity of a client device in a base station. In some embodiments, method 600 may be performed in block S550 of method 500 as shown in FIG. 5.

Method 600 may include one or more operations, actions, or functions as illustrated by one or more of blocks S610, S620 and/or S630. Although illustrated as discrete blocks, various blocks may be divided into additional blocks, combined into fewer blocks, supplemented with other blocks, or eliminated, depending on the desired implementation. In some further examples, the various described blocks may be implemented as a parallel process instead of a sequential process, or as a combination thereof. Method 600 may begin at block S610, "RECEIVING A SIGNAL TRANSMITTED BY THE CLIENT DEVICE."

At block S610, the base station may receive a signal transmitted by the client device. As illustrated in FIG. 1, client device 130 communicating with macro-cell base station 120 may move towards communication range 140 of small-cell base station 110. Thus, when client device 130 is located proximate to or move across the boundary of communication range 140, the proximity detector of small-cell base station 110 may receive a signal transmitted by client device 130 to macro-cell base station 120. Block S610 may be followed by block S620, "ANALYZING A PROPERTY OF THE RECEIVED SIGNAL TO DETERMINE THAT THE CLIENT DEVICE IS WITHIN COMMUNICATION RANGE OF THE BASE STATION."

At block S620, the base station may analyze a property of the received signal to determine that the client device is within communication range of the base station. For example, as illustrated in FIG. 1, small-cell base station 110 may analyze a property of the received signal to determine that client device 130 is within communication range 140 of small-cell base station 110. In some embodiments, the analysis of the property of the signal may include detecting an envelope of the signal to determine whether the envelope of the signal includes a buzz-type waveform. The buzz-type waveform may be a waveform that is included in the signal while client device 130 transmits the signal to macro-cell base station 120 but is not actively engaged in communication with small-cell base station 110. Block S620 may be followed by block S630, "CONVERTING A CURRENT OPERATION MODE OF THE BASE STATION TO A PARTICULAR OPERATION MODE THAT ENABLES THE BASE STATION TO SUPPORT COMMUNICATION WITH THE CLIENT DEVICE."

At block S630, in response to determination that the client device is within the communication range, a current operation mode of the base station may be converted to a particular operation mode that enables the base station to support communication with the client device. As illustrated in FIG. 1, in response to determination that client device 130 is within communication range 140 of small-cell base station 110, the inactive operation mode of small-cell base station 110 may be converted to a particular operation mode that enables base station 110 to support communication with client device 130.

Referring back to FIG. 5, Block S550 may be followed by block S560, "DECODING THE SIGNAL TO OBTAIN DETAILED INFORMATION ON THE CLIENT DEVICE."

At block S560, the base station may decode the signal to obtain detailed information on the client device. For example, with reference to FIG. 1, the received signal may be further decoded, e.g., by snooping, to obtain detailed information on client device 130 (e.g., station ID).

In light of the present disclosure, for this and other methods disclosed herein, the functions and operations performed in the methods may be implemented in differing order. Furthermore, the outlined operations are only provided as examples, and some of the operations may be optional, combined into fewer operations, supplemented with other operations, or expanded into additional operations without detracting from the essence of the disclosed embodiments.

Figure 7:
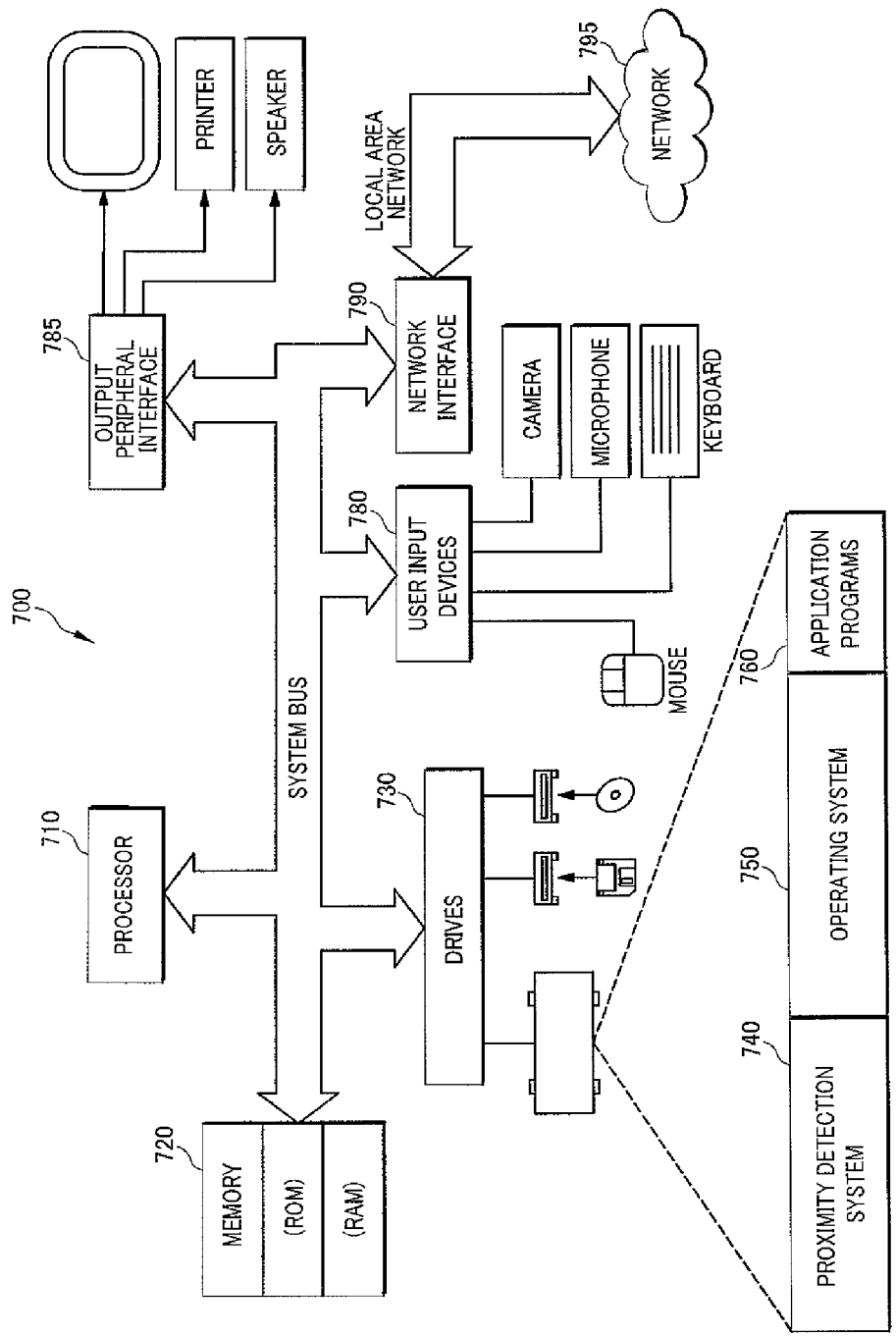
FIG. 7 shows a schematic block diagram illustrating an example computing system that may be configured to detect proximity of a client device in a base station.

FIG. 7 shows a schematic block diagram illustrating an example computing system that may be configured to detect proximity of a client device in a base station, arranged in accordance with at least some embodiments described herein. As depicted in FIG. 7, a computer 700 may include a processor 710, a memory 720 and one or more drives 730. Computer 700 may be implemented as a computer system, an embedded control computer, a laptop, or a server computer, a mobile device, a set-top box, a kiosk, a vehicular information system, a mobile telephone, a customized machine, or other hardware platform.

Drives 730 and their associated computer storage media may provide storage of computer readable instructions, data structures, program modules and other data for computer 700. Drives 730 may include a proximity detection system 740, an operating system (OS) 750, and application programs 760. Proximity detection system 740 may be adapted to control a base station in such a manner as described above with respect to FIGS. 1 to 6.

Computer 700 may further include user input devices 780 through which a user may enter commands and data. Input devices may include an electronic digitizer, a camera, a microphone, a keyboard and pointing device, commonly referred to as a mouse, trackball or touch pad. Other input devices may include a joystick, game pad, satellite dish, scanner, or the like.

These and other input devices may be coupled to processor 710 through a user input interface that is coupled to a system bus, but may be coupled by other interface and bus structures, such as a parallel port, game port or a universal serial bus (USB). Computers such as computer 700 may also include other peripheral output devices such as display devices, which may be coupled through an output peripheral interface 785 or the like.

Computer 700 may operate in a networked environment using logical connections to one or more computers, such as a remote computer coupled to a network interface 790. The remote computer may be a personal computer, a server, a router, a network PC, a peer device or other common network node, and may include many or all of the elements described above relative to computer 700.

Networking environments are commonplace in offices, enterprise-wide area networks (WAN), local area networks (LAN), intranets, and the Internet. When used in a LAN or WLAN networking environment, computer 700 may be coupled to the LAN through network interface 790 or an adapter. When used in a WAN networking environment, computer 700 typically includes a modem or other means for establishing communications over the WAN, such as the Internet or a network 795. The WAN may include the Internet, the illustrated network 795, various other networks, or any combination thereof. It will be appreciated that other mechanisms of establishing a communications link, ring, mesh, bus, cloud, or network between the computers may be used.

In some embodiments, computer 700 may be coupled to a networking environment. Computer 700 may include one or more instances of a physical computer-readable storage medium or media associated with drives 730 or other storage devices. The system bus may enable processor 710 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 720, whether characterized as RAM, ROM, flash, or other types of volatile or nonvolatile memory technology. The media may also represent secondary storage, whether implemented as storage drives 730 or otherwise. Hard drive implementations may be characterized as solid state, or may include rotating media storing magnetically encoded information.

Processor 710 may be constructed from any number of transistors or other circuit elements, which may individually or collectively assume any number of states. More specifically, processor 710 may operate as a state machine or finite-state machine. Such a machine may be transformed to a second machine, or specific machine by loading executable instructions. These computer-executable instructions may transform processor 710 by specifying how processor 710 transitions between states, thereby transforming the transistors or other circuit elements constituting processor 710 from a first machine to a second machine. The states of either machine may also be transformed by receiving input from user input devices 780, network interface 790, other peripherals, other interfaces, or one or more users or other actors. Either machine may also transform states, or various physical characteristics of various output devices such as printers, speakers, video displays, or otherwise.

Figure 8:
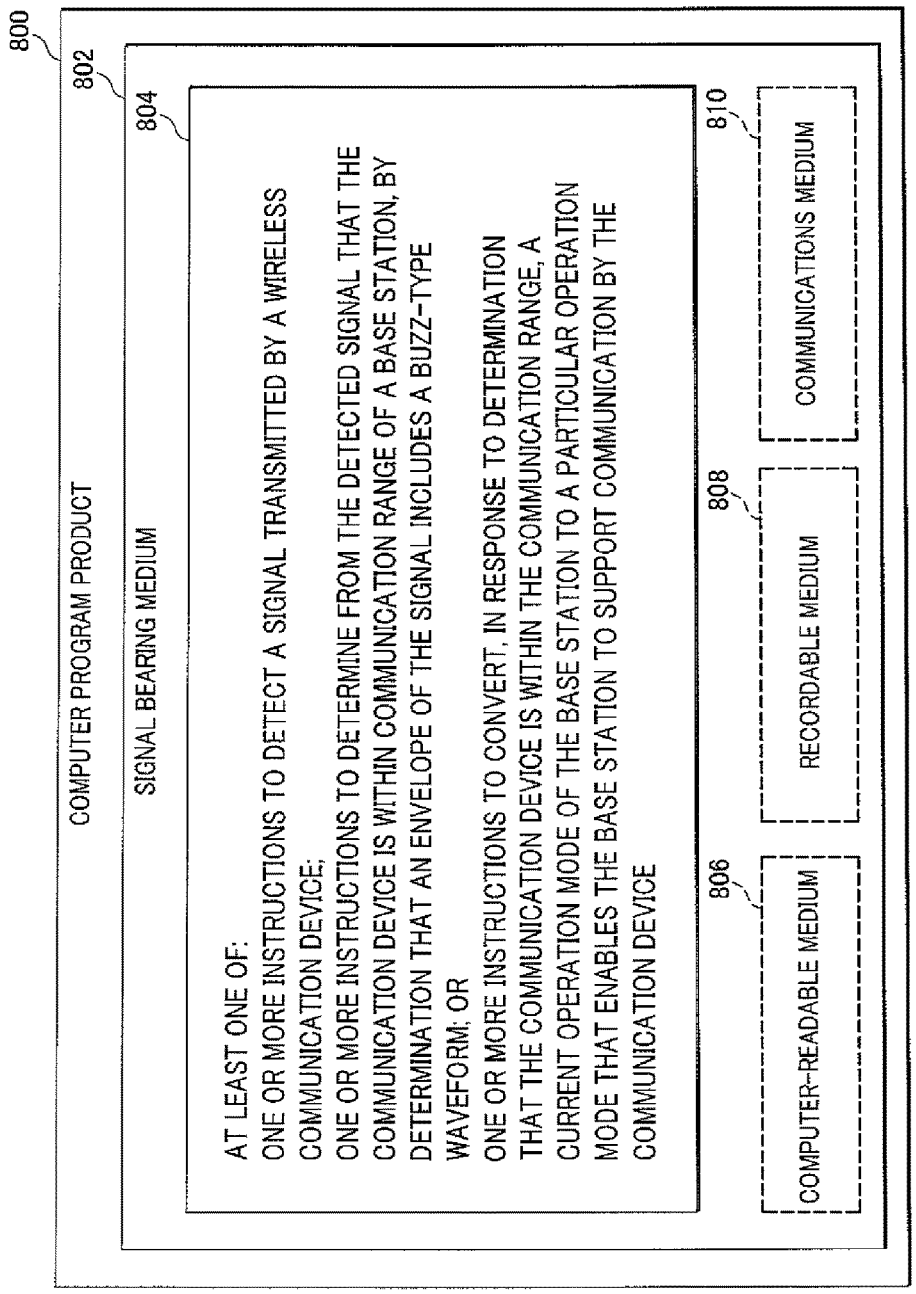
FIG. 8 illustrates computer program products that may be utilized to detect proximity of a client device in a base station, all arranged in accordance with at least some embodiments described herein.

FIG. 8 illustrates computer program products that may be utilized to detect proximity of a client device in a base station, in accordance with at least some embodiments described herein. Program product 800 may include a signal bearing medium 802. Signal bearing medium 802 may include one or more instructions 804 that, in response to execution by, for example, a processor, may provide the functionality and features described above with respect to FIGS. 1 to 7. By way of example, instructions 804 may include at least one of: one or more instructions to detect a signal transmitted by a wireless communication device; one or more instructions to determine from the detected signal that the communication device is within communication range of a base station, by determination that an envelope of the signal includes a buzz-type waveform; or one or more instructions to convert, in response to determination that the communication device is within the communication range, a current operation mode of the base station to a particular operation mode that enables the base station to support communication with the communication device. Thus, for example, referring to FIGS. 1 to 4, base station 110 or envelope detector 400 may undertake one or more of the blocks shown in FIG. 5 or FIG. 6 in response to instructions 804.

In some implementations, signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of base station 110 or envelope detector 400 by an RF signal bearing medium 802, where the signal bearing medium 802 is conveyed by a wireless communications medium 810 (e.g., a wireless communications medium conforming with the IEEE 802.11 standard).

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds, compositions or biological systems, which can, of course, vary. The terminology used herein is for the purpose of describing particular embodiments only, and is not intended to be limiting.

The herein described subject matter sometimes illustrates different components contained within, or connected with, different other components. Such depicted architectures are merely examples, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method in a first base station to detect proximity of a client device, the method comprising:
   receiving a signal transmitted by the client device;
   analyzing a property of the received signal to determine that the client device is within a communication range of the first base station, wherein analyzing the property of the received signal comprises detecting an envelope of the signal, in response to a communication between the client device and a second base station, to determine whether the envelope of the signal includes a buzz-type waveform; and
   in response to the determination that the client device is within the communication range, converting a current operation mode of the first base station to a particular operation mode that enables the first base station to support communication with the client device, wherein a first coverage range of the first base station is smaller than and within a second coverage range of the second base station.

2. The method of claim 1, wherein converting the current operation mode of the first base station to the particular operation mode comprises converting a long term evolution (LTE) low duty mode or dormant state of the first base station to the particular operation mode.

3. The method of claim 1, wherein converting the current operation mode of the first base station to the particular operation mode comprises converting a global system for mobile communications (GSM) dormant state of the first base station to the particular operation mode.

4. The method of claim 1, further comprising decoding uplink control information from the signal.

5. A method in a first base station to detect proximity of a client device, the method comprising:
   receiving a signal transmitted by the client device;
   analyzing a property of the received signal to determine that the client device is within a communication range of the first base station, wherein analyzing the property of the received signal comprises detecting an envelope of the signal, in response to a communication between the client device and a second base station, to determine whether the envelope of the signal includes a buzz-type waveform, and wherein the buzz-type waveform is a waveform that is included in the signal while the client device transmits the signal to the second base station but is not actively engaged in communication with the first base station; and
   in response to the determination that the client device is within the communication range, converting a current operation mode of the first base station to a particular operation mode that enables the first base station to support communication with the client device, wherein a first coverage range of the first base station is smaller than and within a second coverage range of the second base station.

6. The method of claim 5, wherein the signal is an uplink control signal with a low frequency envelope that is transmitted to the second base station.

7. A method in a first base station to detect proximity of a client device, the method comprising:
   receiving a signal transmitted by the client device;
   analyzing a property of the received signal to determine that the client device is within a communication range of the first base station, wherein analyzing the property of the received signal comprises:
      detecting an envelope of the signal, in response to a communication between the client device and a second base station, to determine whether the envelope of the signal includes a buzz-type waveform, and
      determining, whether the detected envelope of the signal matches the buzz-type waveform within a proximity detection threshold; and
   in response to the determination that the client device is within the communication range, converting a current operation mode of the first base station to a particular operation mode that enables the first base station to support communication with the client device, wherein a first coverage range of the first base station is smaller than and within a second coverage range of the second base station.

8. The method of claim 7, further comprising adjusting the proximity detection threshold based on a power strength of the signal.

9. A base station configured to detect proximity of a client device, the base station comprising:
   a receiver configured to receive a signal transmitted by the client device;
   a proximity detector coupled to the receiver and configured to analyze a property of the received signal to determine whether the client device is within a communication range of the base station, wherein the analysis of the property of the received signal comprises detection of an envelope of the signal, in response to a communication between the client device and a different base station, to determine whether the envelope of the signal includes a buzz-type waveform; and
   an operation mode controller coupled to the proximity detector and configured to convert, in response to the determination that the client device is within the communication range of the base station, a current operation mode of the base station to a particular operation mode that enables the base station to support communication with the client device, wherein a first coverage range of the base station is smaller than and within a second coverage range of the different base station.

10. The base station of claim 9, wherein the buzz-type waveform is a waveform that is included in the signal while the client device transmits the signal to the different base station but is not actively engaged in communication with the base station.

11. The base station of claim 10, wherein the signal is an uplink control signal with a low frequency envelope.

12. The base station of claim 9, wherein the proximity detector is further configured to determine whether the detected envelope of the signal matches the buzz-type waveform within a proximity detection threshold.

13. The base station of claim 12, wherein the proximity detector is further configured to adjust the proximity detection threshold based on a power strength of the signal.

14. The base station of claim 9, wherein the proximity detector comprises an envelope detector configured to detect the envelope of the signal, and wherein the envelope detector includes:
- a rectifier configured to convert an alternating current of the signal to a direct current; and
- a low-pass filter coupled to the rectifier and configured to pass low-frequency components of the direct current as the envelope of the signal.

15. The base station of claim 9, wherein, to convert the current operation mode to the particular operation mode, the operation mode controller is configured to convert a long term evolution (LTE) low duty mode or dormant state of the base station to the particular operation mode.

16. The base station of claim 9, wherein, to convert the current operation mode to the particular operation mode, the operation mode controller is configured to convert a global system for mobile communications (GSM) dormant state of the base station to the particular operation mode.

17. The base station of claim 9, wherein the operation mode controller is further configured to decode uplink control information from the signal.

18. The base station of claim 9, wherein the communication range of the base station includes a communication range of a small-cell network.

19. The base station of claim 18, wherein the small-cell network includes at least one of a microcell, a femtocell, a picocell, a relay, and a hotspot.

20. The base station of claim 9, wherein the signal includes a physical uplink control channel (PUCCH) signal or a physical uplink shared channel (PUSCH) signal.

* * * * *